US012417121B2

(12) United States Patent
Dugast et al.

(10) Patent No.: US 12,417,121 B2
(45) Date of Patent: Sep. 16, 2025

(54) MEMORY POOL MANAGEMENT

(71) Applicant: Intel Corporation, Santa Clara, CA (US)

(72) Inventors: Francois Dugast, Karlsruhe (DE); Florent Pirou, Paris (FR); Sujoy Sen, Beaverton, OR (US); Lidia Warnes, Roseville, CA (US); Thomas E. Willis, Redwood City, CA (US); Durgesh Srivastava, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 17/514,530

(22) Filed: Oct. 29, 2021

(65) Prior Publication Data

US 2022/0050722 A1    Feb. 17, 2022

(51) Int. Cl.
G06F 9/50      (2006.01)
G06F 9/4401    (2018.01)
G06F 9/54      (2006.01)

(52) U.S. Cl.
CPC .......... *G06F 9/5016* (2013.01); *G06F 9/4406* (2013.01); *G06F 9/505* (2013.01); *G06F 9/541* (2013.01)

(58) Field of Classification Search
CPC ...... G06F 9/5016; G06F 9/4406; G06F 9/505; G06F 9/541
See application file for complete search history.

(56) References Cited

U.S. PATENT DOCUMENTS

| | | | | |
|---|---|---|---|---|
| 2012/0011504 A1* | 1/2012 | Ahmad | ............ | G06F 12/08 718/1 |
| 2014/0143781 A1* | 5/2014 | Yao | ............ | G06F 9/5016 718/100 |
| 2015/0106582 A1* | 4/2015 | Mai | ............ | G06F 12/08 711/165 |
| 2016/0210049 A1* | 7/2016 | van Riel | ............ | G06F 11/3452 |
| 2019/0034239 A1* | 1/2019 | Cai | ............ | G06F 12/1027 |
| 2023/0074388 A1* | 3/2023 | Rao | ............ | G06F 3/0605 |

OTHER PUBLICATIONS

Menage, Paul et al., "Control Groups", The Linux kernel user's and administrator's guide, Control Groups Version 1, https://www.kernel.org/doc/html/latest/admin-guide/cgroup-v1/cgroups.html, Portions Copyright 2004-2006, 14 pages.

(Continued)

*Primary Examiner* — Edward J Dudek, Jr.
(74) *Attorney, Agent, or Firm* — Compass IP Law PC

(57) ABSTRACT

Examples described herein relate to providing an interface to an operating system (OS) to create different memory pool classes to allocate to one or more processes and allocate a memory pool class with a process of the one or more processes. In some examples, a memory pool class of the different memory pool classes defines a mixture of memory devices in at least one memory pool available for access by the one or more processes. In some examples, memory devices are associated with multiple memory pool classes to provide multiple different categories of memory resource capabilities.

21 Claims, 16 Drawing Sheets

(56) References Cited

OTHER PUBLICATIONS

Redhat 2.10., "2.10. Generating the /etc/cgconfig.conf File", Red Hat Customer Portal, https://access.redhat.com/documentation/en-us/red_hat_enterprise_linux/6/html/resource_management_guide/sec-cgsnapshot, 2017, 4 pages.

Redhat 4.3., "4.3. Per-group Division of CPU and Memory Resources", Red Hat Customer Portal, https://access.redhat.com/documentation/en-us/red_hat_enterprise_linux/6/html/resource_management_guide/sec-cpu_and_memory-use_case, 2013, 8 pages.

Redhat, "Resource Management using Control Groups in Red Hat® Enterprise Linux, Case Study: Database Performance". Red Hat Reference Architecture Series, Version 1.0, Nov. 2010, 27 pages.

* cited by examiner

MEMORY POOL MANAGEMENT

BACKGROUND

Cloud computing provides a client device with access to computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer.

Some remote clusters of devices include a memory pool that is accessible by one or more compute nodes. Frequently access memory pages can be stored in local memory of a compute node whereas less frequently accessed memory pages can be stored in a more distant memory pool. Memory pools have different latency characteristics relative to a compute node whereby the compute node can write or read from some memory pools faster than other memory pools.

Cloud service providers can add infrastructure and servers to support Infrastructure as a Service (IaaS) and Platform as a Service (PaaS). Some solutions expand memory capacity by adding new pools of memory. Demand for hardware resources is elastic and adding additional infrastructure can be expensive and drive up the total cost of ownership (TCO) of a data center, such as when demand for hardware resources is low.

DETAILED DESCRIPTION

Figure 1:
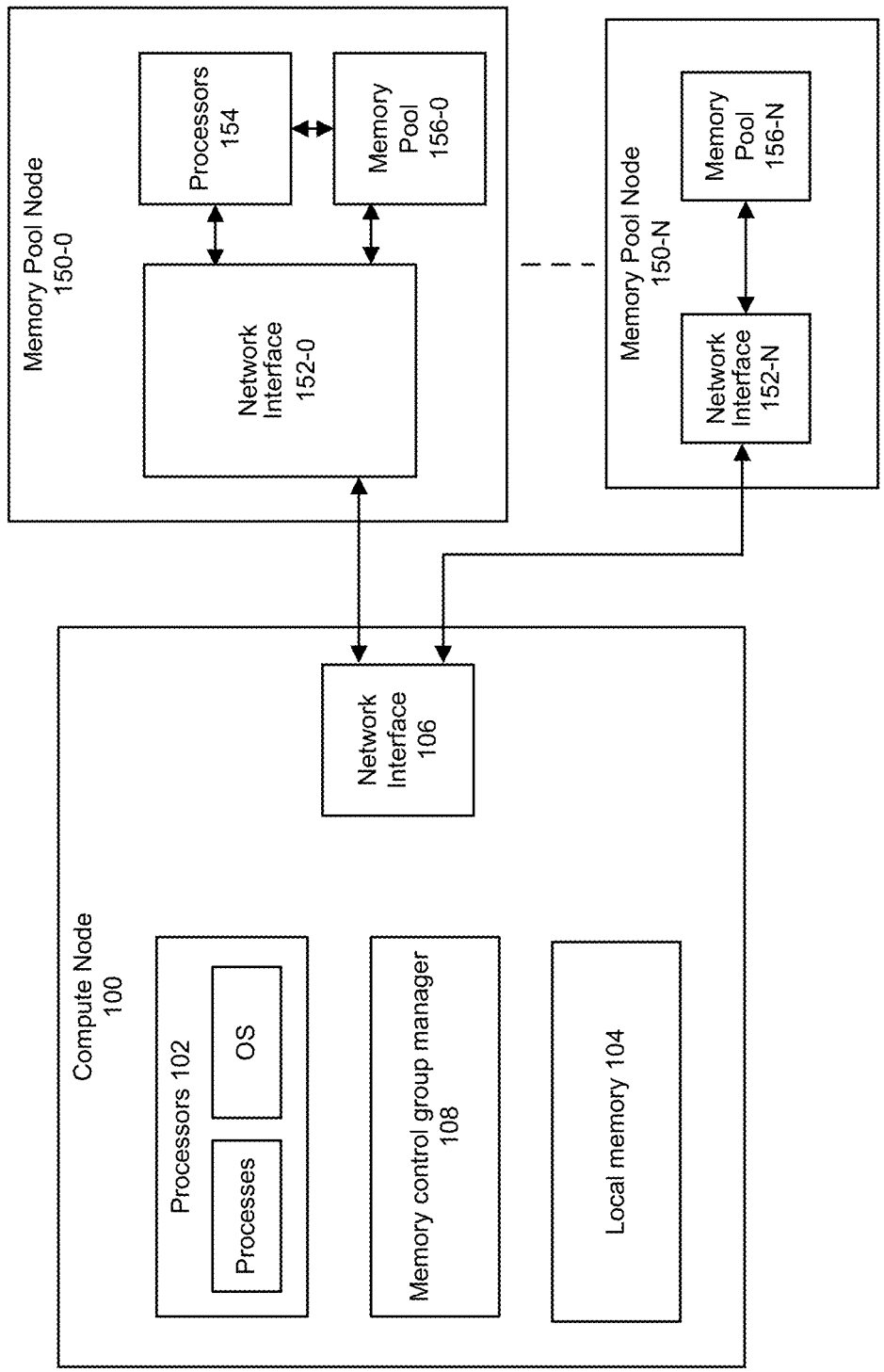
FIG. 1 depicts an example of a system in which memory pools are accessible by a computing node.

Some examples allocate memory from among local and remote memory pools by assigning allocated memory to one or more control group identifiers. Local memory can be part of a system on chip (SoC) or connected and accessible to a circuit board of a compute platform. Pooled memory can be added by connections to switches and routers and accessible via a network or fabric by the compute platform. A control group can represent memory allocated from local memory devices or one or more remote memory pools. Utilization of control groups can limit and throttle utilization of memory pools by workloads. Orchestrators can utilize control group identifiers to control access of a mixture of local memory and different types or latency memory pools. In some examples, an orchestrator can select a particular server, among multiple servers in a data center, to execute a process based on capability of the particular server to access one or memory devices associated with a control group in a manner that meets or exceeds a service level agreement (SLA) associated with the process. Cloud service providers can control an amount of use of memory pools and local memory as well as differentiate between different levels of memory pools.

A control group application program interface (API) or configuration file can define which memory region within the mixture of local memory and memory pools that an application or process can access. In some examples, an operating system (OS) can provide a control group API and a system administrator can use the control group API to define memory resources included and whether a memory pool can be used or not. Some examples provide the OS with capability to select a memory pool among heterogeneous memory pools with differing access rates relative to a compute platform that executes the OS. At an OS level, a mixture of local memory and memory pools can be configured or defined to limit or expand use of local or memory pool resources, and particular memory pool resources among the memory pools. Use of the control group API can allow memory allocation policies by providing control over which memory hardware to use for a workloads based on its control group. A mixture of memory available to a workload can occur using the OS and the workload need not manage the memory allocation.

Some examples provide for cloud service providers to support memory pool aware orchestration policies for containerized workloads. Containerized workloads can be orchestrated on compute nodes based on fine memory requirements (e.g., latency, bandwidth) controlled by the control group API. In some examples, a control group API can allow CSPs to manage allocation of the memory pools to containerized workloads. For example, some workloads can receive access to remote memory pools with higher latency and lower network transmission bandwidth whereas other workloads can receive access to local memory and memory pools with lower latency and higher network transmission bandwidth.

In some examples, service level agreements (SLAs) can be associated with mixtures of hardware memory resources. A compute node can be selected to execute a workload based on available memory on the compute node and whether the workload's SLA can be met by available memory control groups.

FIG. 1 depicts an example of a system in which memory pools are accessible by a computing node. Compute node 100 can include processors 102 (e.g., central processing units (CPUs), graphics processing units (GPUs), cores, field programmable gate array (FPGA), application specific integrated circuit (ASIC), and/or accelerators), and memory resources (e.g., memory, storage, and/or cache). In some examples, a core can be sold or designed by Intel®, ARM®, AMD®, Qualcomm®, IBM®, Texas Instruments®, among others. For example, compute node 100 can execute a process including one or more of: applications, virtual machines, containers, microservices, serverless applications, and so forth. A processor can execute an operating system. For example, compute node 100 can be implemented as a server, rack of servers, computing platform, or others. Compute node 100 can include similar technologies of that of system 1400.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Memory 104 can include one or more of: one or more registers, one or more cache devices (e.g., level 1 cache (L1), level 2 cache (L2), level 3 cache (L3), lower level cache (LLC)), volatile memory device, non-volatile memory device, or persistent memory device. For example, memory 102 can include static random access memory (SRAM) memory technology or memory technology consistent with high bandwidth memory (HBM), or double data rate (DDR), among others. Memory 104 can be connected to processors 102 and/or network interface 106 using a high speed interface (e.g., double data rate (DDR), Compute Express Link (CXL) (e.g., Compute Express Link Specification revision 2.0, version 0.9 (2020), as well as earlier versions, revisions or variations thereof), Peripheral Component Interconnect express (PCIe) (e.g., PCI Express Base Specification 1.0 (2002), as well as earlier versions, revisions or variations thereof), or other interfaces. In some examples, compute node 100 can be formed as a system on chip (SoC).

Compute node 100 can include a network or fabric interface 104 to communicate with one or more memory pool nodes 150-0 to 150-N using a network or fabric. A memory pool node 150 can include a network or fabric interface 152, processors 154 (e.g., CPUs, GPUs, accelerators, and so forth), and memory pool resources 156 (e.g., memory, persistent memory, storage, and/or cache). Although this example shows merely one compute node coupled to multiple memory pool nodes, multiple compute nodes can be coupled to multiple memory pool nodes. For example, one or more of memory pool nodes 150-0 to 150-N can be coupled to network interface 106 using a network interface and one or more switches or routers.

Memory control group manager 108 can map a mixture of memory devices from among local memory 104 and memory pool nodes 150-0 to 150-N to a control group identifier. In some examples, local memory 104 can provide a highest memory access rate (read from memory media or write to memory media), memory pool node 150-0 can provide a next highest memory access rate (read from memory media or write to memory media), and memory pool node 150-N can provide a lowest memory access rate (read from memory media or write to memory media). Some examples manage memory content at a page granularity, although larger or smaller regions of memory can be managed. A memory page can be 4096 bytes, or other sizes.

Memory control group manager 108 can associate a control group identifier with an SLA memory parameter, in some examples. For example, SLA classes can be mapped to control group identifiers using a user space API and accessible to a user space process such as a virtual machine, container, application, microservice, or serverless application. A system administrator or orchestrator can associate a memory pool control group identifier with a user-defined SLA class. SLA classes for memory can complement and be used in addition to classes defining resource allocation policies for control groups such as CPU affinity (e.g., Linux® control groups (cgroups)), network packet priorities, etc.

Memory control group manager 108 can reconfigure a mixture of memory devices associated with a control group identifier at runtime. The reconfigured mixture may not satisfy an associated SLA and may need to be associated with a lower SLA tier for memory device access rates (e.g., rate to access data from a memory or storage media).

To request a control group identifier and associated memory resources, a process can issue a create control group API [control group identifier] to an OS. The OS can manage control group identifiers and associated memory devices. For example, various formats of control group APIs can be used.

Control group API [memory pool identifier, amount of memory to be allocated to processes of a control group] or Control group API [memory pool identifier, percentage of memory allocated to process from available local memory and memory pool].

In some examples, memory control group manager 108 can be performed by a process executed by processors 102 or programmable or fixed function circuitry.

Figure 2:
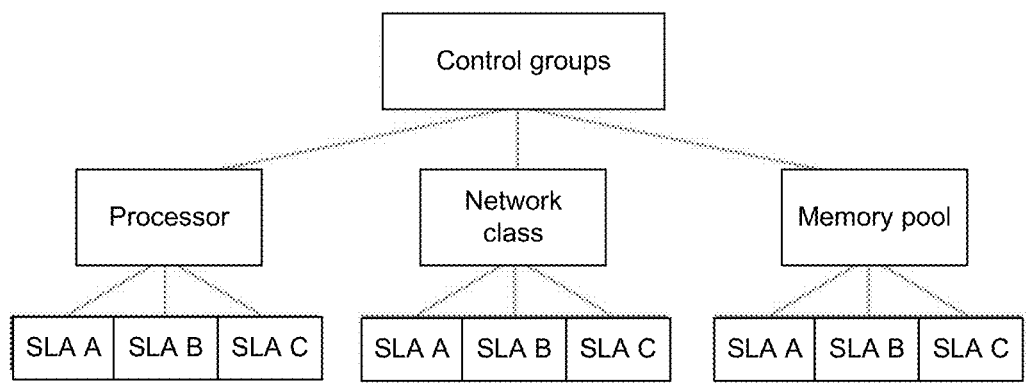
FIG. 2 depicts an example of control group association with CPUs, network classes, and memory pools.

FIG. 2 depicts an example of control group association with CPUs, network classes, and memory pools. Control groups provide capabilities of limiting or throttling utilization of specific CPU, network interface device resources, and memory resources by workloads. Ab OS kernel can allocate addressable memory regions in memory devices to a control group. A control group API in user space can be accessed so that a system administrator or an orchestrator can configure a mixture of memory devices and associated memory address ranges in the memory devices that are available for access. Table 1 bellow provides an example of mappings of processor resources, network interface device transmit rates, and memory pools to SLA levels.

can be available for usage by process A and process B. For example, memory pool 302 can provide a local memory pool (to the processors that execute process A and B) with a highest data access rate (e.g., read and/or write rate), but have a smallest size (e.g., amount of data that can read or written) and largest cost relative to memory pools 304 and 306. Memory pool 302 can represent a first non-uniform memory access (NUMA) node.

For example, memory pool 304 can provide a local memory pool (to the processors that execute process A and B) with a second highest data access rate (e.g., read and/or write rate), but have a medium size and largest cost relative to memory pools 302 and 306. Memory pool 304 can represent a second NUMA node. A second NUMA node can represent a different NUMA domain than that of the first NUMA node. The second NUMA node can provide a different access time to memory in the second NUMA node than the access time to memory of the first NUMA node.

For example, memory pool 306 can provide a remote memory pool (to the processors that execute process A and B) with a lowest highest data access rate (e.g., read and/or write rate), but have a largest size and lowest cost relative to memory pools 302 and 304.

Different control group identifiers 308 can be assigned to memory pools 302-306. For example, control group identi-

TABLE 1 mapping memory pool utilization policies to SLA classes

|  | SLA class A (premium) | SLA class B (basic) | SLA class C (entry) |
|---|---|---|---|
| CPU affinity | 0-63 | 64-70 | 71-72 |
| Network transmit rate class | Priority 1 | Priority 2 | Priority 3 |
| Memory pool 1 (fast memory access rate, small memory size) | 4 GB max per process | 512 MB max per process 60% max per process | No use |
| Memory pool 2 (fast memory access rate, medium memory size) | 8 GB max per process | 4 GB max per process | 512 MB max per process 40% max per process |
| Memory pool 3 (slow memory access rate, large memory size) | Unlimited use | 8 GB max per process | 4 GB max per process |
| Memory pool 4 (slow memory access rate, large memory size) | Unlimited use | Unlimited use | Unlimited use |

In this example, control group identifiers can be class A, class B and class C.

In some examples, for a memory pool, a control group identifier can allow setting:

values for the maximum and the minimum amount of memory which can be allocated to each process in a group (e.g., 512 MB from pool A, 32 MB from pool B, 0 MB from pool C);

values for the maximum and the minimum amount of memory which can be allocated from the whole group to one or more processes (e.g., 8 GB from pool A, 1 GB from pool B, 0 MB from pool C); and/or proportion of memory to allocate from each memory pool (example: 60% from pool A, 40% from pool B).

Figure 3:
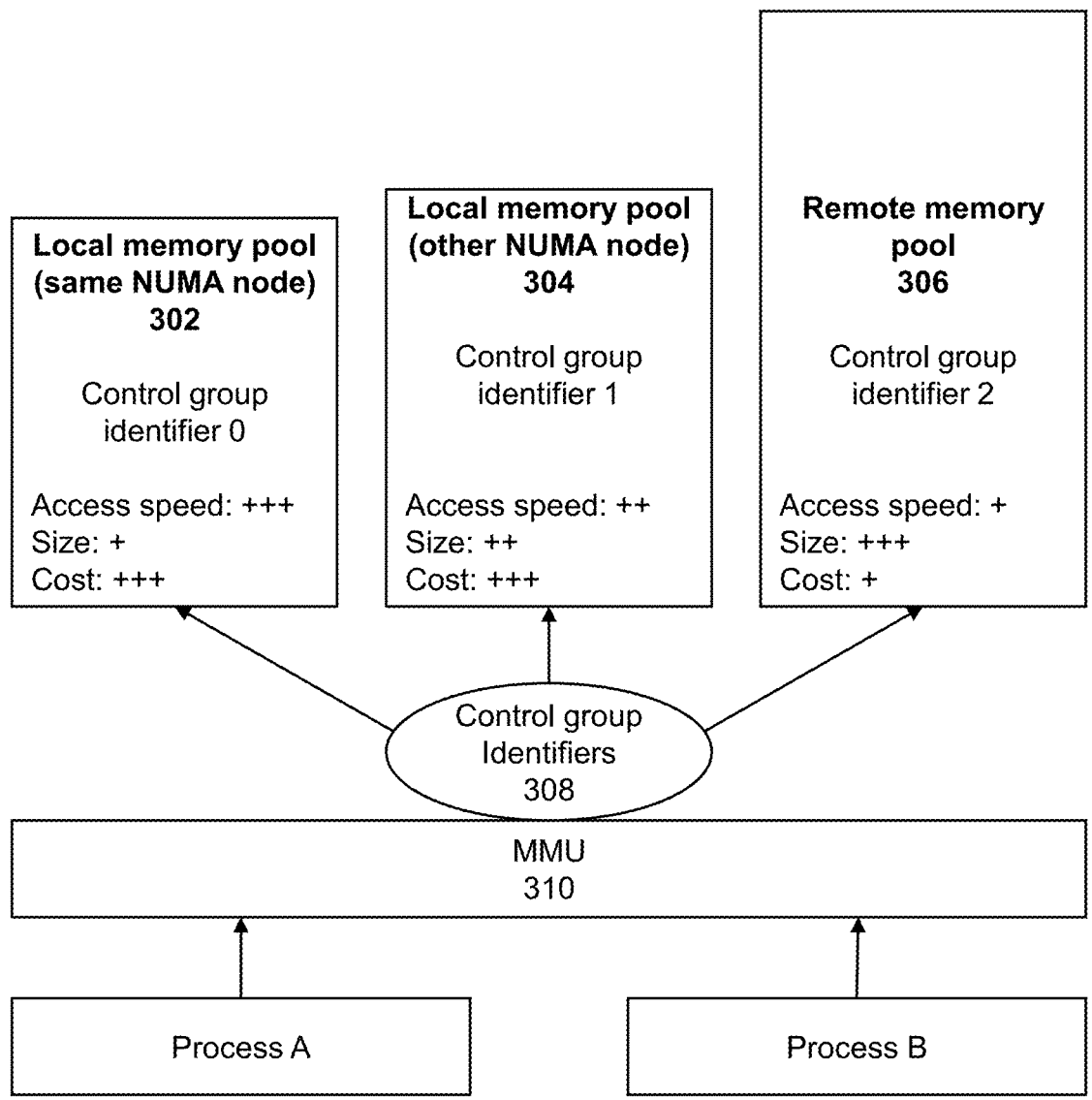
FIG. 3 depicts an example of allocating memory from different memory pools based on control group policies to a process.

FIG. 3 depicts an example of allocating memory from different memory pools based on control group policies to a process. Different memory pools have different characteristics. For example, multiple memory pools 302, 304, and 306 fiers 0, 1, and 2 can be associated with respective memory pools 302, 304, and 306. Note that memory devices within memory pools 302-306 can change and an associated speed, size, and cost can stay the same.

Memory management unit (MMU) 310 can perform virtual-to-physical memory address translation. MMU 310 can provide process A with access to a memory address range in a memory pool or pools associated with a control group identifier that is assigned to process A. Similarly, MMU 310 can provide process B with access to a memory address range in a memory pool or pools associated with a control group identifier that is assigned to process B. The control group identifiers assigned to process A and process B can be the same or different.

Figure 4:
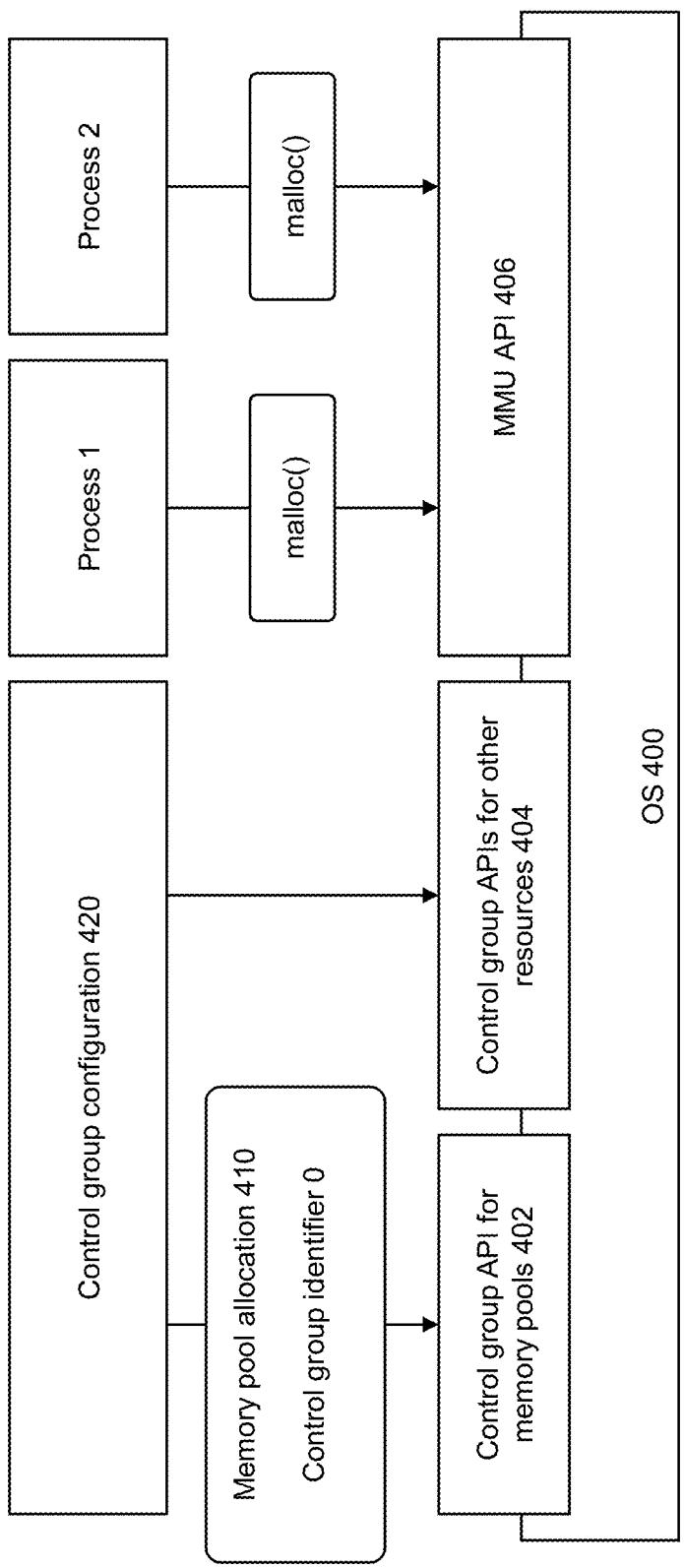
FIG. 4 depicts an example manner of configuring a control groups of resources.

FIG. 4 depicts an example manner of configuring a control groups of resources. For example, using control group API 402, operating system 400 can configure or receive a configuration of a control group identifier. The control group identifier can refer to a memory pool allocation 410 of merely local memory, merely one or more memory pools, or a mixture of local memory and one or more memory pools, as described herein. A service or daemon can communicate memory pool allocation 410 to OS 400 using control group API 402, to create and configure memory devices in a memory pool control group. In some examples, a control group can be created using a Linux cgconfig file. Memory pool control group creation can occur at OS boot or re-boot, in some examples.

Memory pool allocation 410 can include and allocation of maximum amount of memory allocated in one or more memory pools, peak memory access rate, and relative percentage of available memory available to a process, even if memory allocated to the process is less than the maximum amount of memory allocated in one or more memory pools allocated to the process. For example, memory pool allocation 410 can indicate a process associated with a control group identifier defined using API 402 is allocated at most 2 GB or at most 10% of allocated memory from pool A, 4 GB from pool B, and nothing from pool C. Memory pool allocation 410 can be associated with a control group identifier 0. More control groups with different values can be defined to implement different policies.

Control group APIs for other resources 404 can provide an allocation of processor and/or network interface resources associated with a control group identifier for allocation to a process (e.g., process 1 or 2). In response to a request via MMU API 406 from process 1 or 2, memory associated with control group identifier 0 can be allocated to process 1 or 2. Memory allocation (malloc( )) according to the control group policy can be handled by the kernel.

Figure 5:
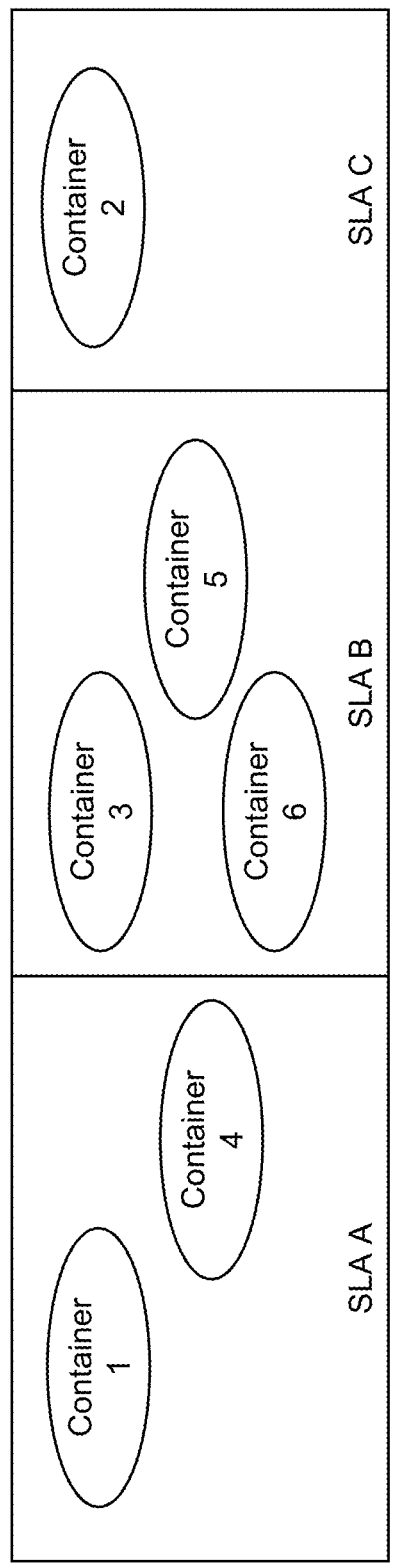
FIG. 5 depicts an example of association of containers with SLA classes.

With respect to FIGS. 5-8, although containers are depicted, VMs, microservices, applications, serverless applications, or other processes can be associated with SLA classes. FIG. 5 depicts an example of association of containers with SLA classes. For example, containers 1 and 4 can be associated with SLA A; containers 3, 5, and 6 can be associated with SLA B; and container 2 can be associated with SLA C. Processes running in containers can access the resources available to an associated SLA class so that resource configuration per-process or workload need not take place and memory pool (and other resources) can be available by virtue of SLA class of a container.

As SLA classes are user-defined, the actual mapping of SLA class to system resources can vary from one system to another. In the example above, a system can exist where no SLA class C is defined and no remote memory pool is available.

Figure 6:
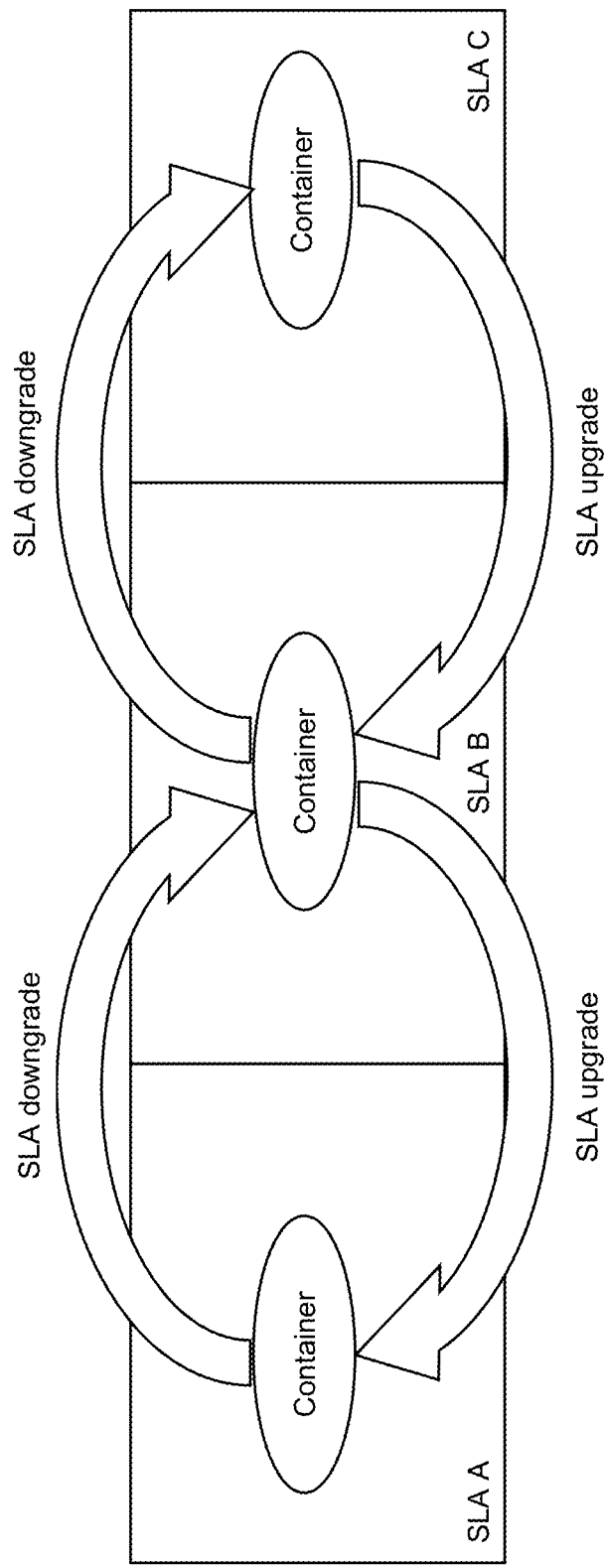
FIG. 6 depicts an example of a change of SLA class associated with a container.

FIG. 6 depicts an example of a change of SLA class associated with a container. A container can be associated with an upgraded or downgraded SLA class by associating a different SLA class with the container. Memory available to a container can be adjusted by associating a different SLA class with the container. CSPs can change a memory resource control group identifier allocated to a container to change in conjunction with a change of SLA class. Memory resources allocated to a container can change dynamically at container runtime based on overall resource availability or based on product offering.

For example, a premium SLA class can provide access to local memory resources while also offering extended memory support from a remote memory pool. An entry SLA class can offer limited access to local memory and favor use of a remote memory. Some options can be provided to temporarily upgrade the SLA class of a workload from entry to premium for a given period to allows fast data processing. Once the data processing period is over, the SLA class of the workload reverts to entry.

Figure 7:
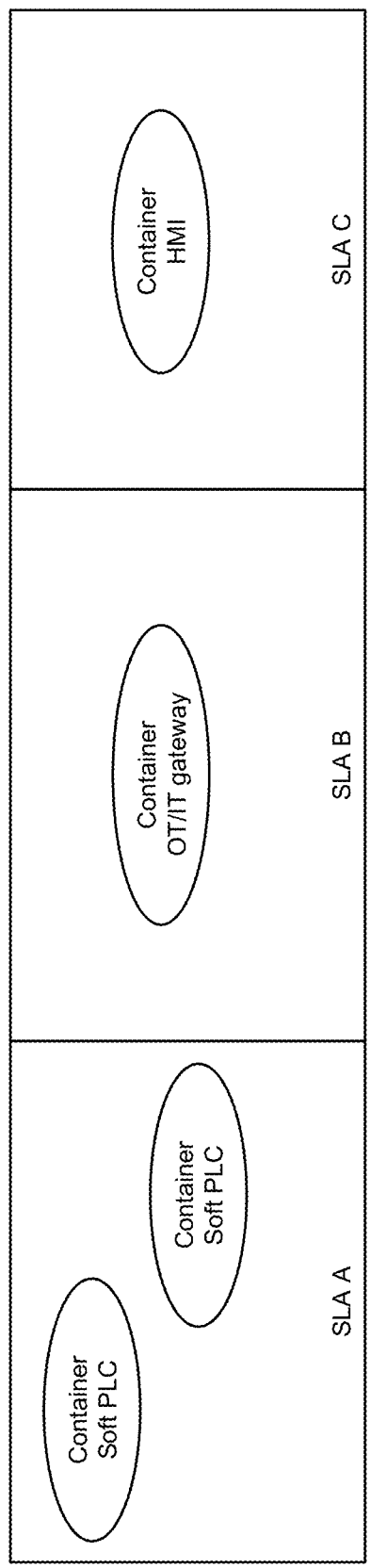
FIG. 7 depicts an example of association of an SLA class with a container depending on workload criticality.

FIG. 7 depicts an example of association of an SLA class with a container depending on workload criticality. Workload requirements in consolidated systems with mixed criticality vary from workload to workload. For example, in industrial systems, soft programmable logic controller (PLC) workloads can request low and deterministic latency access to local memory for real-time and 5G Time Sensitive Networking (TSN) applications. On the other hand, workloads of low criticality can make use of available resources opportunistically. This can be the case with containerized human machine interfaces (HMIs) or information technology (IT) systems with operational technology (OT) gateways. With the SLA classes associated with control group identifiers, policies can be enforced to provide such workloads only with a specific memory pool. In a case of mixed criticality, a specific memory pool can be a remote memory, which offers lower performance than local memory. For example, an orchestrator can manage execution of best effort workloads with low criticality on a pool of compute nodes, while providing memory resources needed for the system to function are exclusively allocated to workloads with high criticality. Examples of orchestrators include Kubernetes, Management and Orchestration (MANO), Docker, and so forth.

In a microservice architecture, containerized workloads may not be bound to a specific hardware resource and can allow for better utilization of resources and less underutilized resources. As an example, in an HMI workload, rendering and displaying are decoupled such that rendering occurs on one node and is streamed to another node with a display of the video stream. In this example the rendering workload has low criticality, and can be pinned to entry SLA class C and utilize remote memory. If the GPU resource is getting low because a workload of SLA class B requests it, the orchestrator can migrate this workload to a compute node where the GPU is free, while ensuring memory resources follow the SLA class C policy.

Figure 8:
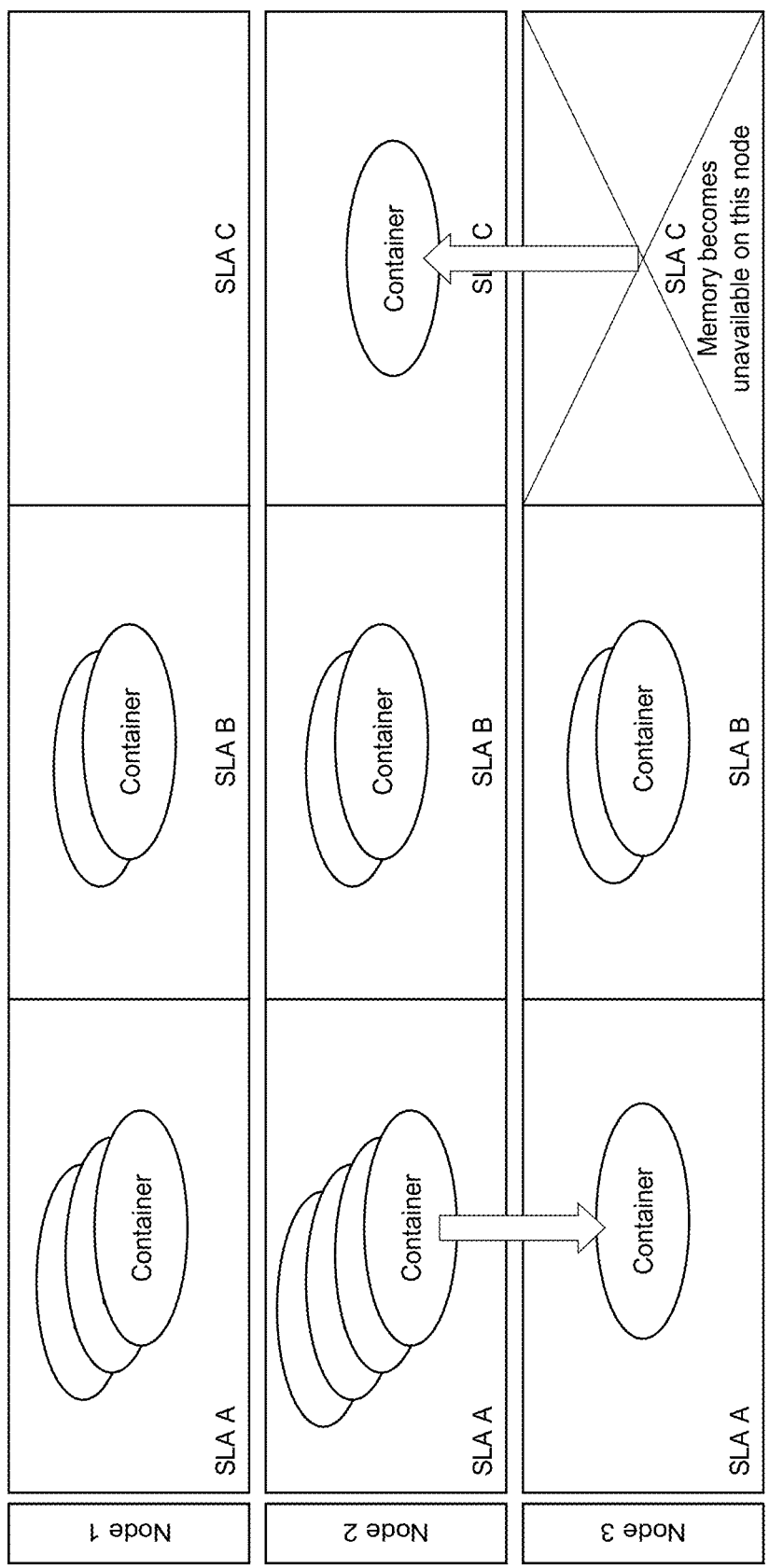
FIG. 8 depicts an example of load-balancing across nodes based on memory pool availability.

FIG. 8 depicts an example of load-balancing across nodes based on memory pool availability. Orchestration of execution of containers on nodes can be memory aware such that containers can be migrated to different nodes and retain memory performance. A system of nodes can be controlled by a common orchestrator which is control-group aware. When a memory pool is added to resources associated with a control group, the orchestrator can make use of the memory pool where needed, on top of existing resource constraints such as CPU or network load balancing.

For example, a container can be migrated from node 2 to node 3 within a same SLA class A and maintain utilization of the same memory control group. For example, when local memory pool availability is low on node 2, the container can be migrated to node 3 to retain memory resource capability.

For example, a container can be migrated from node 3 to node 2 within the same SLA class C, when a pool of remote memory becomes unavailable for SLA class C on node 3 to retain memory resource capability when executed on node 2.

Figure 9:
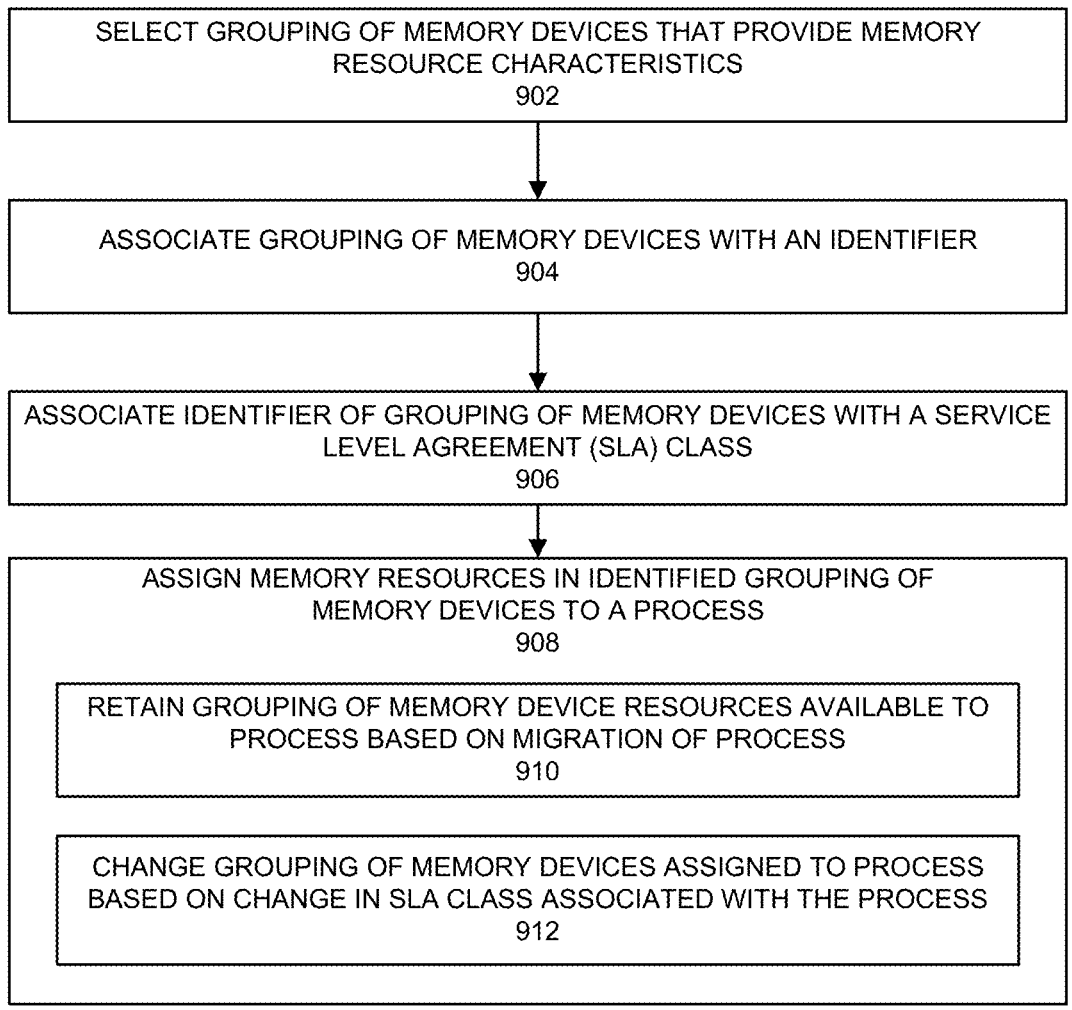
FIG. 9 depicts an example process.

FIG. 9 depicts an example process. The process can be performed by one or more of: an operating system, orchestrator, processor, or circuitry. At 902, a selection can occur of a mixture of memory devices from among local memory and one or more memory pools. In some examples, different memory pools can exhibit different amount of addressable memory addresses, memory access latency (e.g., rate of writing or reading data), and cost or same size, memory access latency, and cost. In some examples, the mixture can include no local memory and merely addressable memory regions allocated in one or more memory pools.

At 904, a control group identifier can be associated with the mixture of memory devices. Different control group identifiers can identify a different mixtures of memory devices with different characteristics of amount of addressable memory addresses, memory access latency, and cost. At 906, the control group identifier can be associated with a user-defined service level agreement (SLA) class or tier. For example, a control group identifier associated with characteristics of amount of addressable memory addresses, memory access latency, and cost can be associated with an SLA class or tier that specifies memory device characteristics that are met or exceeded by that associated with the control group identifier.

At 908, a control group identifier can be assigned to a process to provide access to memory resources. For example, an API can be used to assign memory resources to a process based on SLA class or tier associated with the process. In some examples, at 910, based on migration of execution of the process to another compute node, memory resources available to the process can be maintained. For example, a same mixture of memory devices can continue to be available to the process executing on another compute node. However, if characteristics of the memory devices change based on a change in compute node that executes the process, such as higher latency, to a point that an SLA for the process will not be met when executed on the another node, the process can return to 906 to assign a different grouping of memory devices to the process to satisfy an SLA class or tier of the process.

At 912, based on a change of SLA class or tier associated with the process, another grouping of memory devices can be assigned to the process. The another grouping of memory devices can provide resources that satisfy the changed SLA class or tier. For example, if the SLA class or tier increases to a higher class or tier, another grouping of memory devices can be selected for use by the process whose resources meet or exceed the requirements of the next SLA class or tier, and the control group identifier of such another grouping of memory devices can be associated with the SLA class and the process. For example, if the SLA class or tier decreases to a higher class or tier, another grouping of memory devices can be selected for use by the process whose resources meet or exceed the requirements of the decreased SLA class or tier, and the control group identifier of such another grouping of memory devices can be associated with the decreased SLA class and the process.

Accordingly, utilization of memory devices can be managed by use of control group identifiers for mixtures of memory devices.

Data Placement in Tiered Memory Systems

Some examples use memory with at least two levels of memory (alternatively referred to herein as "2LM") that includes cached subsets of system disk level storage (in addition to, for example, run-time data). This main memory includes a first level (alternatively referred to herein as "near memory") including smaller faster memory made of, for example, dynamic random access memory (DRAM) or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

In tiered memory systems such as 2LM and pooled memory systems, the CPU can address memory devices with heterogenous latency and bandwidth characteristics. Slow memory can refer to high-latency memory and/or low network bandwidth whereas fast memory can refer to low-latency memory and/or high-bandwidth network interface. Such environments can include pooled memory based on NUMA nodes or on systems with persistent memory and/or volatile memory. Using a memory pool as far memory will have performance implication on jobs. Round trip time (RTT) of a packet traversal from a sender to a receiver and back to the sender can be considered in determining whether a memory pool is considered far, slow, near, or fast.

Data placement strategies include using fastest memory until it is full, then using the next fastest memory until it is full, and so on; moving data in memory close to where a process is running (e.g., CPU); moving the process close to where its data is stored; and others. When memory access patterns by a process vary largely between one memory region and another memory region and access patterns vary over time, such data placement strategies may not reduce latency of accessing data. Pages can be anticipated not to be needed and moved to slow memory and then moved back to fast memory as they are accessed, then moved to slow memory again, and so on (ping-pong). Workload execution can be suspended due to the page table structure being locked during data movement. In addition, network and memory bandwidth is occupied by page movement, which can negatively impact performance of other workloads.

Some examples utilize artificial intelligence (AI)-based technologies to detect memory access patterns per clustered pages for a workload and use this information to determine whether to pre-fetch data to nearer memory to the processor that executes the workload or migrate data to further memory away from the processor that executes the workload. Using memory access pattern detection to predict accesses in a tiered memory system can increase available nearer memory by moving pages predicted to remain cold or not accessed to slow memory or further away memory, thus freeing fast or nearer memory. Examples can prefetching cold pages which are predicted to be accessed by moving them from slow memory to fast memory before a page fault occurs. Examples can prohibit movement of pages to slow memory which are predicted to be accessed again. Examples can schedule page movement when memory bandwidth and/or network bandwidth occupation are anticipated to be low to reduce a likelihood that memory bandwidth and network bandwidth limit workload performance.

Figure 10:
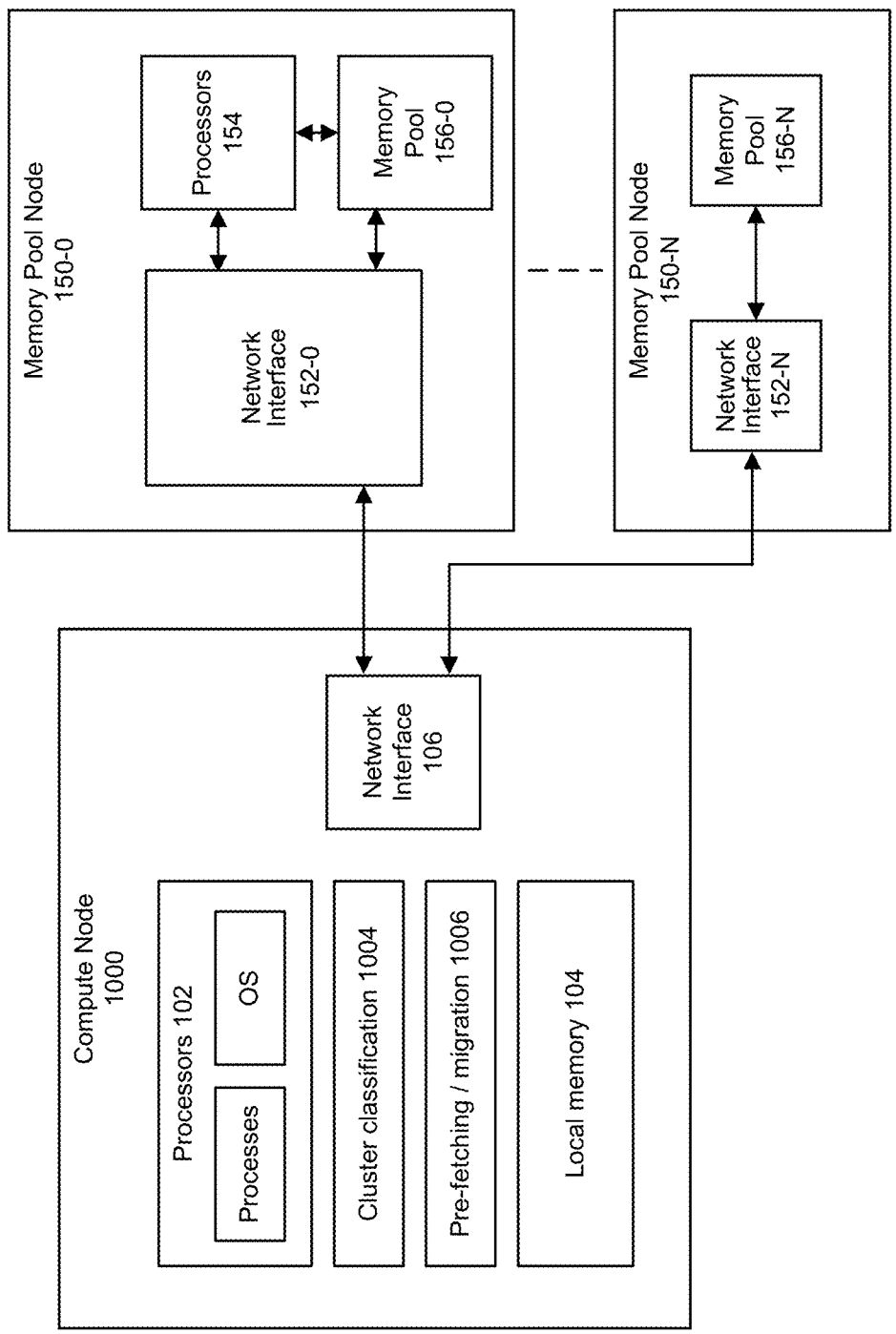
FIG. 10 depicts an example system

FIG. 10 depicts an example system. Compute node 1000 can include similar technologies of that of compute node 100 and/or system 1400. Compute node 1000 can access data in local memory 104 and/or data stored in one or more of memory pool nodes 150-0 to 150-N. In some examples, cluster classification 1004 and/or pre-fetching/migration 1006 can be performed by a process executed by processors 102 or programmable or fixed function circuitry.

Cluster classification 1004 can determine one or more pages that are to be part of a cluster or class. Classes can be defined dynamically depending on the workload or job and based on a memory access pattern. Memory access patterns can vary considerably for the pages accessed by a given workload, even within a given statically defined classes. For example, variance among memory access patterns can be influenced by: a split between initial memory allocation for a workload engine and per-user-request memory allocation; a Java-based workload which implies specific patterns due to the Java virtual machine (JVM) memory management; workloads running in a virtual machine running a complete OS, including redundant and possibly unused services.

Cluster classification 1004 can consider a data category to determine whether a cluster or class is to be monitored for data access patterns to predict whether data is to be migrated to further, slower, or colder memory or storage; pre-fetched to near or faster memory; or retained in the memory in which it is stored. For example, some data categories are more likely to be stored in local memory. For example, the following types of data, defined by OS classes, are more likely to be accessed and more likely stored in local memory: file operations (e.g., mapping of file into memory and read write for files) even with low access frequency; shared objects (e.g., graphics library) with low access frequency; a heap; or a stack. However, anonymous pages with low access frequency can be moved to remote memory or slower memory.

Some clusters or classes of data can be excluded from monitoring for data access patterns to predict whether data is to be migrated, pre-fetched, or retained. For example, pages pointing to shared objects (e.g., .so or .dll) which can be used by other processes and are to be retained in local memory and not be moved as movement could negatively impact their execution.

A processor-executed OS can access a page table (PT) that keeps track of whether a page was accessed or not. The OS can store metadata of accesses of a page over time in memory or a register. OS can expose this page access information to a process in user space. Table 1 below illustrates a data structure of metadata of pages by a process indicating accesses of pages $p_1, p_2, \ldots p_n$ at time stamps $t_1, t_2, \ldots t_n$ with i indicating whether the page was accessed or not during this time stamp.

TABLE 1

|       | $t_1$        | $t_2$        | ... | $t_n$        |
|-------|--------------|--------------|-----|--------------|
| $p_1$ | $i(t_1, p_1)$ | $i(t_2, p_1)$ |     | $i(t_n, p_1)$ |
| $p_2$ | $i(t_1, p_2)$ | $i(t_2, p_2)$ |     | $i(t_n, p_2)$ |
| ...   |              |              |     |              |
| $p_m$ | $i(t_1, p_m)$ | $i(t_2, p_m)$ |     | $i(t_n, p_m)$ |

Metadata from kernel page structures can be accessed via an interface to copy the metadata to selected user space processes. The metadata can be available to the kernel, which controls the memory management unit (MMU). Example of metadata includes an access bit carried in a page table entry that indicates whether data associated with the page table entry has been accessed or not accessed and is considered a hot page or cold page. Hot pages can refer to memory pages with high-access frequency by a process or group of processes whereas cold pages can refer to memory pages with low-access frequency by a process or group of processes. Kernel space code can perform page walks with limited impact of workload execution performance to expose metadata to user space processes or pre-fetching/migration 1006.

In some examples, pre-fetching/migration 1006 can poll for metadata of pages over time of a given process or group of processes. The information can be stored for asynchronous offline analysis, which allows learning from previous accesses to data. Deciding whether and where to move pages on page-by-page basis is CPU intensive. In some examples, pre-fetching/migration 1006 can perform analysis on a cluster basis, where a cluster potentially includes multiple pages. A cluster ID can represent a group of one or more pages. A cluster ID can be based on an access pattern where pages of a cluster with similar access patterns are grouped into a cluster. In some examples, pre-fetching/migration 1006 can determine whether to pre-fetch or migrate data at cluster level. For example, clusters can be grouped based on number of accesses over a time window. A cluster ID can represent a range of cluster accesses over time window such as [0-1000 accesses], [1001-3000 accesses], etc.

Based on identified clusters of one or more pages for non-excluded classes, pre-fetching/migration 1006 can track memory access for a given process or group of processes (e.g., VM, container, microservice, serverless application) and predict whether a cluster or one or more pages is to be accessed or not in future time window. For example, based on multiple time intervals where X % of time a cluster was accessed and (100−X) % of time a cluster was not accessed, such cluster can be kept in local memory. For example, based on Y % of time a cluster was accessed and (100−Y) % of time a cluster was not accessed, the cluster can be copied to a memory pool. In some examples, Y is less than X. More recent time intervals could be weighed more heavily than older time intervals to determine if a cluster is to be migrated from near memory to a memory pool. AI and ML inference technologies can be used to predict hot or cold clusters using graph analytics based on sparse data.

FIGS. 11, 12, 13A, and 13B depict an example of clustering pages into clusters and predicting future accesses to data to determine which data to migrate from cache and/or local memory to a memory pool, migrate from a memory pool to a slower memory pool, or retain in its present memory.

Figure 11:
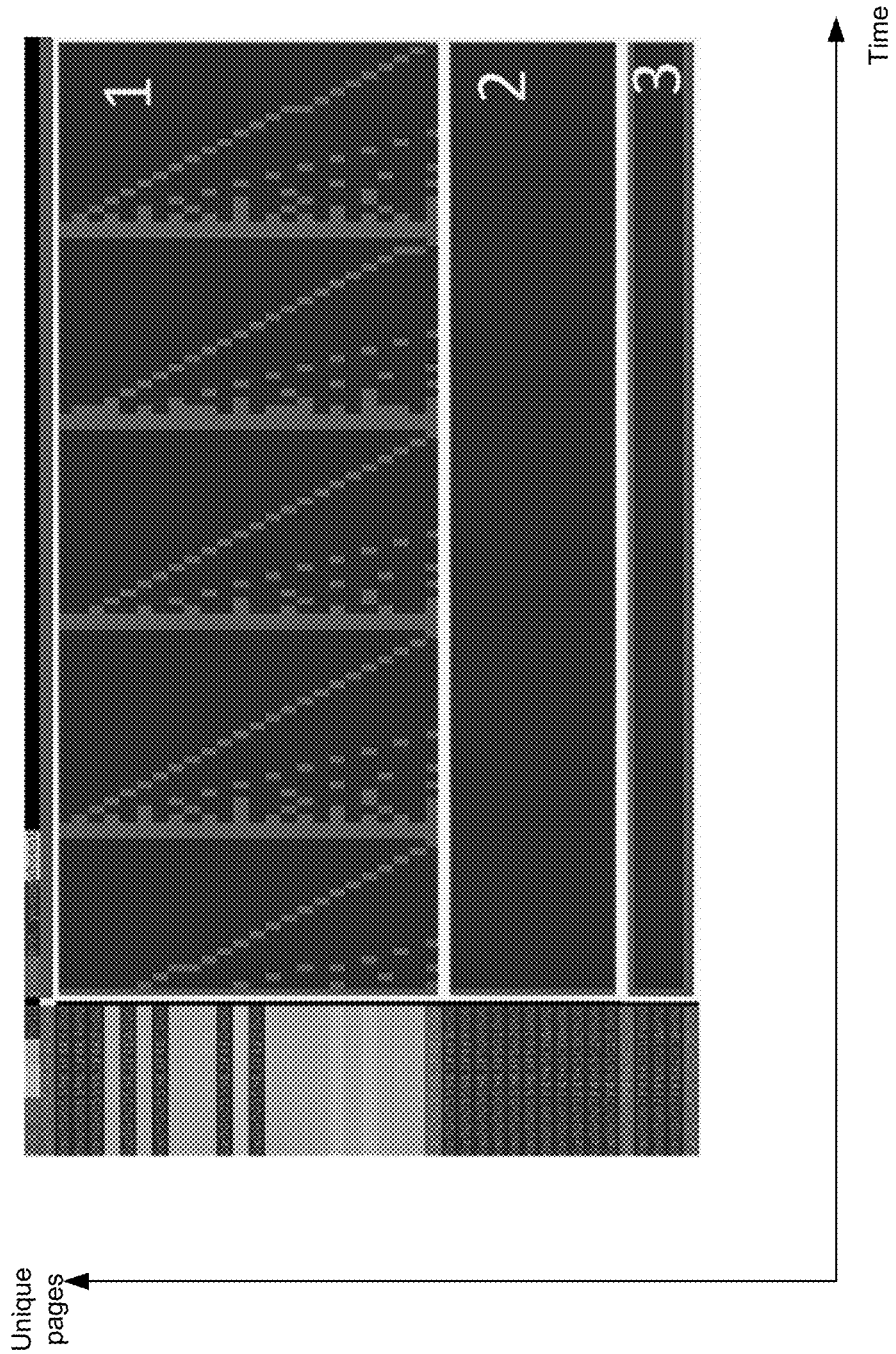
FIGS. 11, 12, 13A, and 13B depict an example of clustering pages into clusters and predicting future accesses to data to determine which data to migrate from cache and/or local memory to a memory pool, migrate from a memory pool to a slower memory pool, or retain in its present memory.

FIG. 11 depicts an example of access patterns. The X axis represents time, the Y axis represents unique pages and squares represent a page was accessed during a time window. For illustration, the diagram below shows memory access per page for a given process or group of processes over time. Some examples can group pages together to a cluster and predict accesses to a cluster of pages. Mapping of pages to a cluster can be achieved by using page metadata collected in user space over sampling times as a time series. In the example of FIG. 11, clusters 1, 2, and 3 can be identified based on number of page accesses per time window. Cluster 1 pages can remain in local or fast memory as data in cluster 3 pages is most frequently accessed. Clusters 2 and 3 can have such infrequent accesses, that pages associated with clusters 2 and 3 can be moved to a memory pool for the life span of a process.

Figure 12:
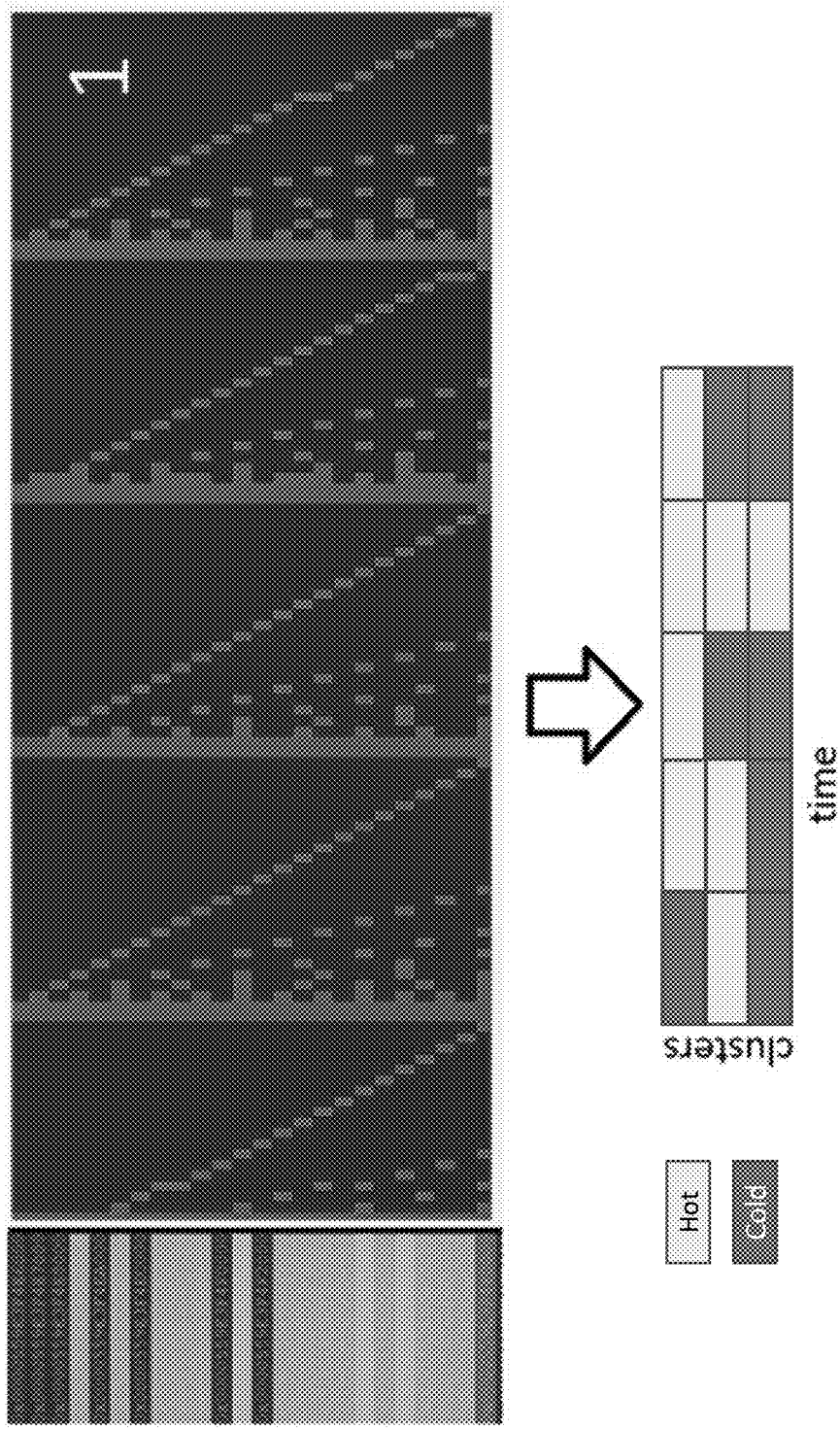

FIG. 12 depicts an example of assignments of pages to clusters or subclusters. Pages with similar access patterns can be grouped into cluster 1. For example, pages with a number of accesses over a time window within a first range can be assigned to a first subcluster and pages with a number of accesses over a time window within a second range can be assigned to a second subcluster. In this example, within cluster 1, a first subcluster can represent hot pages whereas a second subcluster can represent cold pages. Pages associated the first subcluster can be migrated or pre-fetched to local or faster memory relative to the processor that executes the process that accesses data in the first subcluster, or retained in local or faster memory if such pages are already stored in local or faster memory. Pages associated the second subcluster, which are less frequently accessed, can be migrated to a slower memory relative to the processor that executes the process that accesses data in the second subcluster. Accordingly, pages can be divided into subclusters to determine whether to migrate or pre-fetch data.

Figure 13A:
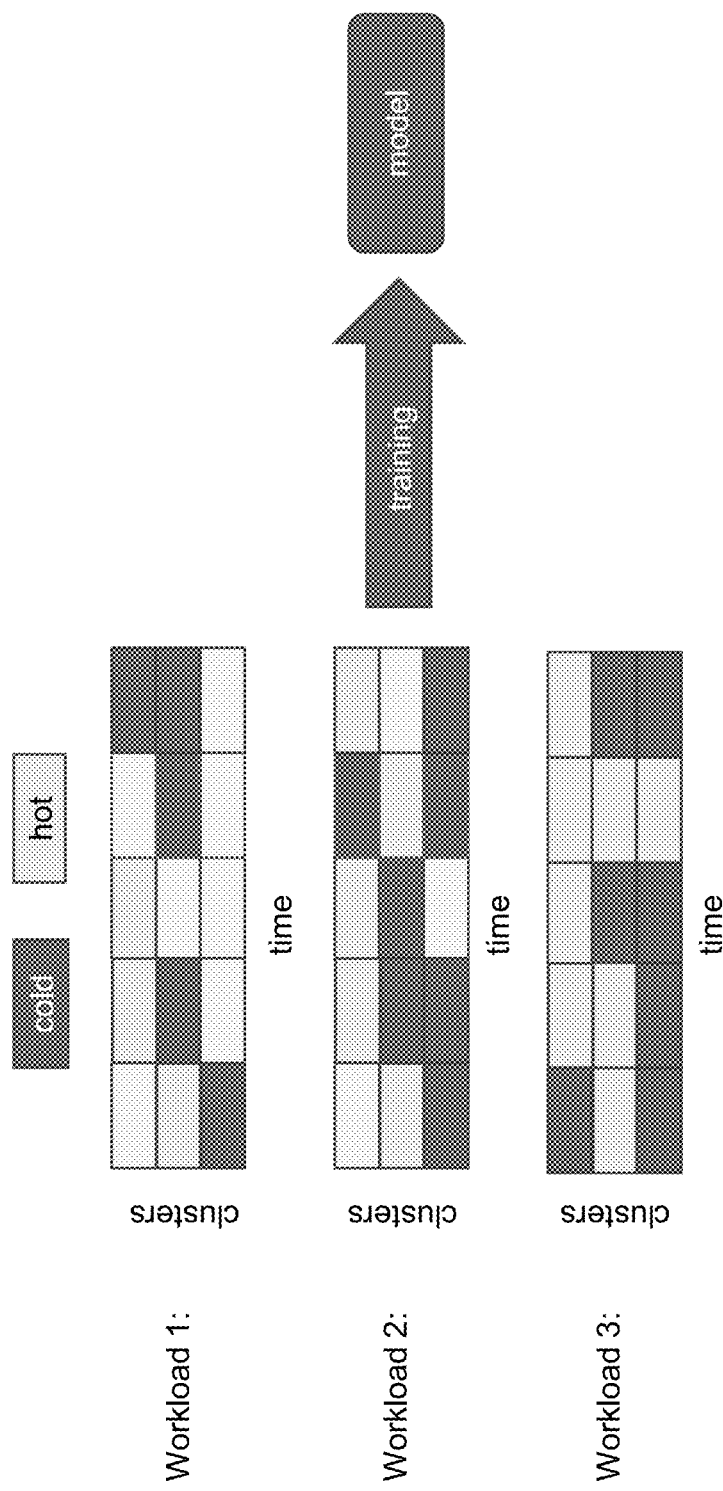

FIG. 13A depicts an example of pattern detection for subclusters. Access rates of a subcluster of one or more pages can be used to train an AI model to perform pattern detection and predict whether the subcluster is likely to be hot or cold in a future time window. An AI model can be trained with the access rate input from subclusters separately to detect a pattern with a given confidence. If the confidence is low because memory accesses in a cluster appear random, which is inevitable, then the model can be discarded. Otherwise, if a confidence level for a model meets or exceeds a threshold, the model can be kept and improved over repeated runs using different workloads in a particular hardware environment. This is particularly suited to a microservice architecture with clones of the same process or group of processes producing content or a response to a user request.

Figure 13B:
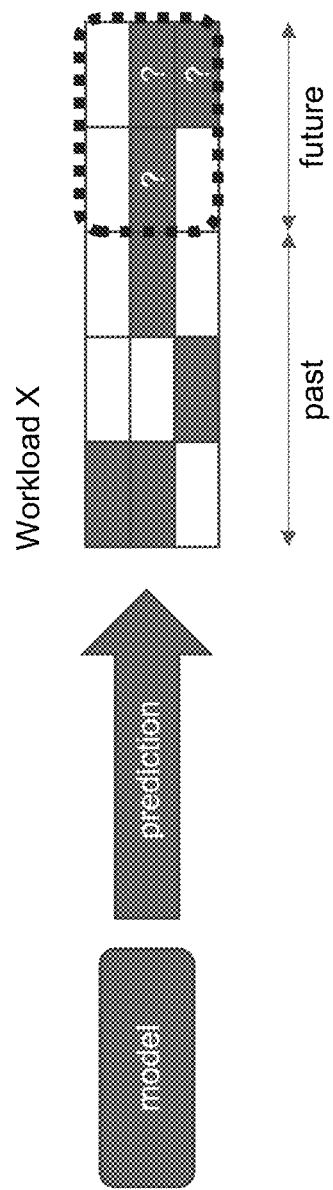

FIG. 13B depicts an example of usage of a trained model to predict whether a subcluster will store hot or cold pages in a subsequent time region. The trained model can be used to identify known memory access patterns by clusters and thus predict accesses at cluster level. Based on predicted hot or cold states of a subcluster, pre-fetching, migration, or retention of one or more pages can occur, as described herein.

Figure 14:
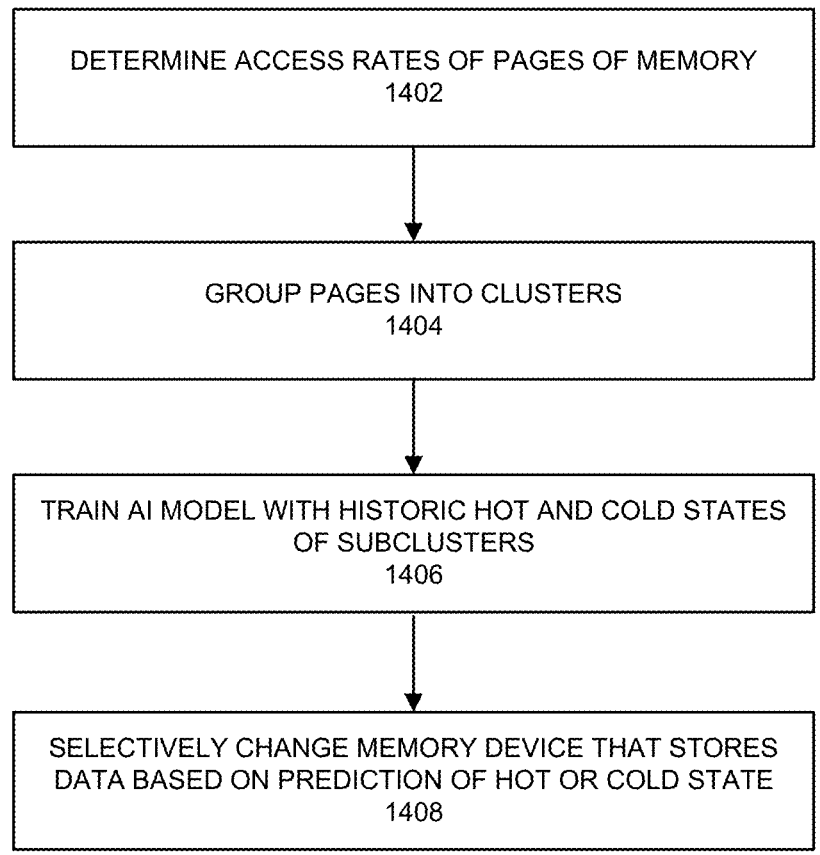
FIG. 14 depicts an example process.

FIG. 14 depicts an example process. At 1402, determine access rates of pages of memory. For example, memory can include local memory to a processor that executes a process that accesses data from the pages as well as one or more network or fabric connected memory pools. At 1404, group pages within access rate buckets and associated pages within buckets with clusters. For example, kernel-space metadata on page accesses can be surfaced to a user space process and access rates for pages can be tracked. Pages with access rates that fit within a same window can be grouped into a same cluster. At 1406, an AI model can be trained based on access patterns to subclusters. For example, a cluster of data that does not include excluded categories (described earlier) can be divided into subclusters and hot and cold states of subclusters can be identified. Based on hot and cold states of subclusters, an AI model can be trained. At 1408, a prediction can be made as to whether to pre-fetch data, migrate data, or retain data in its memory device. Data can be pre-fetched into local or faster memory based on a predicted hot state of the data in a time window of interest. Data can be migrated into remote pooled memory or slower memory based on a predicted slow state of the data in a time window of interest. Data can be retained in a memory location if a prediction of a hot or cold state in the time window of interest aligns with the memory that stores that data.

Figure 15:
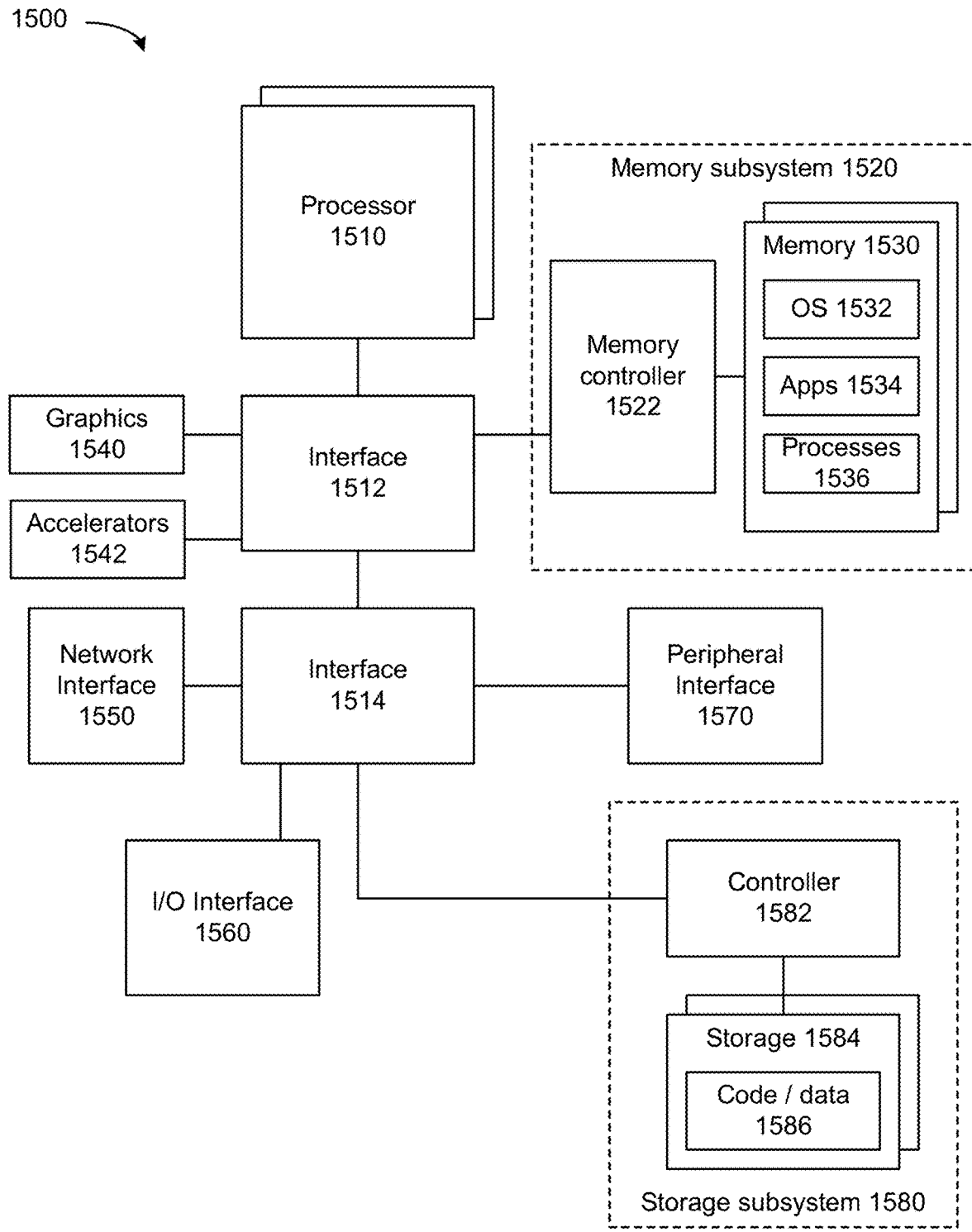
FIG. 15 depicts an example system.

FIG. 15 depicts an example computing system. System 1500 can be used to determine whether to associate memory resources with a control group and SLA class, pre-fetch, migrate or retain data, as described herein. Processor 1510 can include any type of microprocessor, central processing unit (CPU), graphics processing unit (GPU), processing core, or other processing hardware to provide processing for system 1500, or a combination of processors. Processor 1510 controls the overall operation of system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1500 includes interface 1512 coupled to processor 1510, which can represent a higher speed interface or a high throughput interface for system components that needs higher bandwidth connections, such as memory subsystem 1520 or graphics interface components 1540, or accelerators 1542. Interface 1512 represents an interface circuit, which can be a standalone component or integrated onto a processor die. Where present, graphics interface 1540 interfaces to graphics components for providing a visual display to a user of system 1500. In one example, graphics interface 1540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1540 generates a display based on data stored in memory 1530 or based on operations executed by processor 1510 or both. In one example, graphics interface 1540 generates a display based on data stored in memory 1530 or based on operations executed by processor 1510 or both.

Accelerators 1542 can be a fixed function or programmable offload engine that can be accessed or used by a processor 1510. For example, an accelerator among accelerators 1542 can provide compression (DC) capability, cryptography services such as public key encryption (PKE), cipher, hash/authentication capabilities, decryption, or other capabilities or services. In some embodiments, in addition or alternatively, an accelerator among accelerators 1542 provides field select controller capabilities as described herein. In some cases, accelerators 1542 can be integrated into a CPU socket (e.g., a connector to a motherboard or circuit board that includes a CPU and provides an electrical interface with the CPU). For example, accelerators 1542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1520 represents the main memory of system 1500 and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for system 1500. In one example, memory subsystem 1520 includes memory controller 1522, which is a memory controller to generate and issue commands to memory 1530. It will be understood that memory controller 1522 could be a physical part of processor 1510 or a physical part of interface 1512. For example, memory controller 1522 can be an integrated memory controller, integrated onto a circuit with processor 1510.

In some examples, OS 1532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1500 includes interface 1514, which can be coupled to interface 1512. In one example, interface 1514 represents an interface circuit, which can include standalone components and integrated circuitry. In one example, multiple user interface components or peripheral components, or both, couple to interface 1514. Network interface 1550 provides system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can transmit data to a device that is in the same data center or rack or a remote device, which can include sending data stored in memory.

Some examples of network interface 1550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1500 includes one or more input/output (I/O) interface(s) 1560. I/O interface 1560 can include one or more interface components through which a user interacts with system 1500 (e.g., audio, alphanumeric, tactile/touch, or other interfacing). Peripheral interface 1570 can include any hardware interface not specifically mentioned above. Peripherals refer generally to devices that connect dependently to system 1500. A dependent connection is one where system 1500 provides the software platform or hardware platform or both on which operation executes, and with which a user interacts.

In one example, system 1500 includes storage subsystem 1580 to store data in a nonvolatile manner. In one example, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (e.g., the value is retained despite interruption of power to system 1500). Storage 1584 can be generically considered to be a "memory," although memory 1530 is typically the executing or operating memory to provide instructions to processor 1510. Whereas storage 1584 is nonvolatile, memory 1530 can include volatile memory (e.g., the value or state of the data is indeterminate if power is interrupted to system 1500). In one example, storage subsystem 1580 includes controller 1582 to interface with storage 1584. In one example controller 1582 is a physical part of interface 1514 or processor 1510 or can include circuits or logic in both processor 1510 and interface 1514.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1500. More specifically, power source typically interfaces to one or multiple power supplies in system 1500 to provide power to the components of system 1500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes a computer-readable medium comprising instructions stored thereon, that if executed by one or more processors, cause the one or more processors to: provide an interface to an operating system (OS) to create different memory pool classes to allocate to one or more processes and allocate a memory pool class with a process of the one or more processes.

Example 2 includes one or more examples, wherein the interface comprises an application program interface (API) or configuration file.

Example 3 includes one or more examples, wherein a memory pool class of the different memory pool classes defines a mixture of memory devices in at least one memory pool available for access by the one or more processes.

Example 4 includes one or more examples, comprising instructions stored thereon, that if executed by one or more processors, cause the one or more processors to: associate memory devices with multiple memory pool classes to provide multiple different categories of memory resource capabilities.

Example 5 includes one or more examples, comprising instructions stored thereon, that if executed by one or more processors, cause the one or more processors to: change memory devices associated with the memory pool class of the different memory pool classes based on changes in memory resource availability.

Example 6 includes one or more examples, comprising instructions stored thereon, that if executed by one or more processors, cause the one or more processors to: associate the memory pool class of the different memory pool classes with a service level agreement (SLA) class, wherein the SLA class specifies required memory resource capabilities of the process of the one or more processes.

Example 7 includes one or more examples, wherein based on migration of the process of the one or more processes to another compute node, the migrated process retains access to the allocated memory pool class.

Example 8 includes one or more examples, comprising instructions stored thereon, that if executed by one or more processors, cause the one or more processors to: classify a group of two or more memory pages into a cluster based on number of accesses over a time period; classify a second group of two or more memory pages into a second cluster based on number of accesses over the time period; and on a cluster-by-cluster basis, determine whether to pre-fetch data or migrate data associated with the cluster.

Example 9 includes one or more examples, comprising instructions stored thereon, that if executed by one or more processors, cause the one or more processors to: provide page access numbers over a time region at a user space process to identify accesses of a page over time.

Example 10 includes one or more examples, comprising instructions stored thereon, that if executed by one or more processors, cause the one or more processors to: predict whether data associated with the cluster is to be accessed in a future time period, wherein the determine whether to pre-fetch data or migrate data associated with the cluster comprises: based on a prediction that data associated with the cluster is to be accessed in the future time period, pre-fetch the data into a memory that is associated with lower latency access than a memory that stores the data.

Example 11 includes one or more examples, comprising instructions stored thereon, that if executed by one or more processors, cause the one or more processors to: based on a prediction that data associated with the cluster is not to be accessed in the future time period, migrate the data into a memory that is associated with higher latency access than a memory that stores the data.

Example 12 includes one or more examples, wherein the pre-fetch the data into a memory that is associated with lower latency access than a memory that stores the data comprises: cause data migration when memory bandwidth occupation is anticipated to be less than a threshold.

Example 13 includes one or more examples, and includes an apparatus comprising: a memory pool comprising memory devices and circuitry, when operational, configured to: provide access to a set of one or more memory devices in the memory pool in connection with an access to a memory pool class, wherein the set of one or more memory devices in the memory pool are allocated to the memory pool class.

Example 14 includes one or more examples, wherein the memory pool class is to define a mixture of memory devices in the memory pool available for access by one or more processes.

Example 15 includes one or more examples, wherein a second set of one or more memory devices in the memory pool are allocated to a second memory pool class and wherein the set and second set of one or more memory devices are associated with different categories of memory resource capabilities.

Example 16 includes one or more examples, comprising a server communicatively coupled to the memory pool, wherein a process is allocated to access the set of one or more memory devices associated with the memory pool class and wherein based on migration of the process from the server to another server, the migrated process is to retain access to the set of one or more memory devices.

Example 17 includes one or more examples, comprising a server communicatively coupled to the memory pool and comprising a memory device, wherein the memory device is allocated to the memory pool class.

Example 18 includes one or more examples, comprising a server communicatively coupled to the memory pool, wherein the server is to: provide an interface to an operating system (OS) to create different memory pool classes to allocate to one or more processes executed on the server and allocate the memory pool class to a process of the one or more processes.

Example 19 includes one or more examples, comprising a datacenter, wherein the datacenter comprises the server, a second server, and the memory pool and wherein the second server is to execute an orchestrator to select the server to execute a process based on capability of the server to access the set of one or memory devices associated with the memory pool class meeting or exceeding a service level agreement (SLA) associated with the process.

Example 20 includes one or more examples, and includes a method comprising: allocating one of different memory pool classes to a process, wherein the allocated memory pool class is associated with a mixture of memory devices comprising memory devices of a memory pool.

Example 21 includes one or more examples, and includes classifying a group of two or more memory pages into a cluster based on number of accesses over a time period; classifying a second group of two or more memory pages into a second cluster based on number of accesses over the time period; and on a cluster-by-cluster basis, determining whether to pre-fetch data or migrate data associated with the cluster.

What is claimed is:

1. At least one non-transitory computer-readable medium comprising instructions stored thereon, that if executed by one or more processors, cause the one or more processors to:
   provide an interface to an operating system (OS) to create different memory pool classes to allocate to one or more processes and
   allocate a memory pool class with a process of the one or more processes, wherein based on migration of the process of the one or more processes to execute on another compute node, the migrated process retains access to the allocated memory pool class.

2. The computer-readable medium of claim 1, wherein the interface comprises an application programming interface (API) or configuration file.

3. The computer-readable medium of claim 1, wherein a memory pool class of the different memory pool classes defines a mixture of memory devices in at least one memory pool available for access by the one or more processes.

4. The computer-readable medium of claim 1, comprising instructions stored thereon, that if executed by one or more processors, cause the one or more processors to:
   associate memory devices with multiple memory pool classes to provide multiple different categories of memory resource capabilities.

5. The computer-readable medium of claim 1, comprising instructions stored thereon, that if executed by one or more processors, cause the one or more processors to:
   change memory devices associated with the memory pool class of the different memory pool classes based on changes in memory resource availability.

6. The computer-readable medium of claim 1, comprising instructions stored thereon, that if executed by one or more processors, cause the one or more processors to:
   associate the memory pool class with a service level agreement (SLA) class, wherein the SLA class specifies required memory resource capabilities of the process of the one or more processes.

7. The computer-readable medium of claim 1, comprising instructions stored thereon, that if executed by one or more processors, cause the one or more processors to:
   classify a group of two or more memory pages into a cluster based on number of accesses over a time period;
   classify a second group of two or more memory pages into a second cluster based on number of accesses over the time period; and
   on a cluster-by-cluster basis, determine whether to pre-fetch data or migrate data associated with the cluster.

8. The computer-readable medium of claim 7, comprising instructions stored thereon, that if executed by one or more processors, cause the one or more processors to:
   provide page access numbers over a time region to identify accesses of a page over time.

9. The computer-readable medium of claim 7, comprising instructions stored thereon, that if executed by one or more processors, cause the one or more processors to:
   predict whether data associated with the cluster is to be accessed in a future time period, wherein the determine whether to pre-fetch data or migrate data associated with the cluster comprises:

based on a prediction that data associated with the cluster is to be accessed in the future time period, pre-fetch the data into a memory that is associated with lower latency access than a memory that stores the data.

10. The computer-readable medium of claim 9, comprising instructions stored thereon, that if executed by one or more processors, cause the one or more processors to:

based on a prediction that data associated with the cluster is not to be accessed in the future time period, migrate the data into a memory that is associated with higher latency access than a memory that stores the data.

11. The computer-readable medium of claim 9, wherein the pre-fetch the data into a memory that is associated with lower latency access than a memory that stores the data comprises:

cause data migration when memory bandwidth occupation is anticipated to be less than a level.

12. The computer-readable medium of claim 1, wherein the another compute node comprises a processor and wherein the processor comprises one or more of: a central processing unit (CPU), graphics processing unit (GPU), core, field programmable gate array (FPGA), application specific integrated circuit (ASIC), and/or memory device.

13. An apparatus comprising:

a processor to execute an orchestrator and
a memory pool comprising memory devices and circuitry, when operational, configured to:
provide access to a set of one or more memory devices in the memory pool in connection with an access to a memory pool class, wherein the set of one or more memory devices in the memory pool are allocated to the memory pool class and wherein the orchestrator is to select a server to execute a process based on capability of the server to access the set of one or memory devices associated with the memory pool class meeting or exceeding a service level agreement (SLA) associated with the process.

14. The apparatus of claim 13, wherein the memory pool class is to define a mixture of memory devices in the memory pool available for access by one or more processes.

15. The apparatus of claim 13, wherein a second set of one or more memory devices in the memory pool are allocated to a second memory pool class and wherein the set and second set of one or more memory devices are associated with different categories of memory resource capabilities.

16. The apparatus of claim 13, comprising a server communicatively coupled to the memory pool, wherein a process is allocated to access the set of one or more memory devices associated with the memory pool class and wherein based on migration of the process from the server to the another server, the migrated process is to retain access to the set of one or more memory devices.

17. The apparatus of claim 13, comprising a server communicatively coupled to the memory pool and comprising a memory device, wherein the memory device is allocated to the memory pool class.

18. The apparatus of claim 13, comprising a server communicatively coupled to the memory pool, wherein the server is to:

provide an interface to an operating system (OS) to create different memory pool classes to allocate to one or more processes executed on the server and
allocate the memory pool class to a process of the one or more processes.

19. A method comprising:

allocating one of different memory pool classes to a process, wherein the allocated memory pool class is associated with a mixture of memory devices comprising memory devices of a memory pool;
classifying a group of two or more memory pages into a cluster based on number of accesses over a time period;
classifying a second group of two or more memory pages into a second cluster based on a number of accesses over the time period; and
on a cluster-by-cluster basis, determining whether to pre-fetch data or migrate data associated with the cluster.

20. The method of claim 19, comprising:

selecting a processor to execute a process based on capability of the processor to access the memory devices of the memory pool.

21. The method of claim 19, comprising:

providing access to a set of one or more memory devices in the memory pool in connection with an access to a memory pool class, wherein the set of one or more memory devices in the memory pool are allocated to the memory pool class and
selecting a processor to execute the process based on capability of the processor to access the set of one or memory devices associated with the memory pool class meeting or exceeding a service level agreement (SLA) associated with the process.

* * * * *